Dec. 17, 1929.     J. CANTÚ     1,739,577
ELECTRIC SIGN
Filed Aug. 10, 1928     2 Sheets-Sheet 1
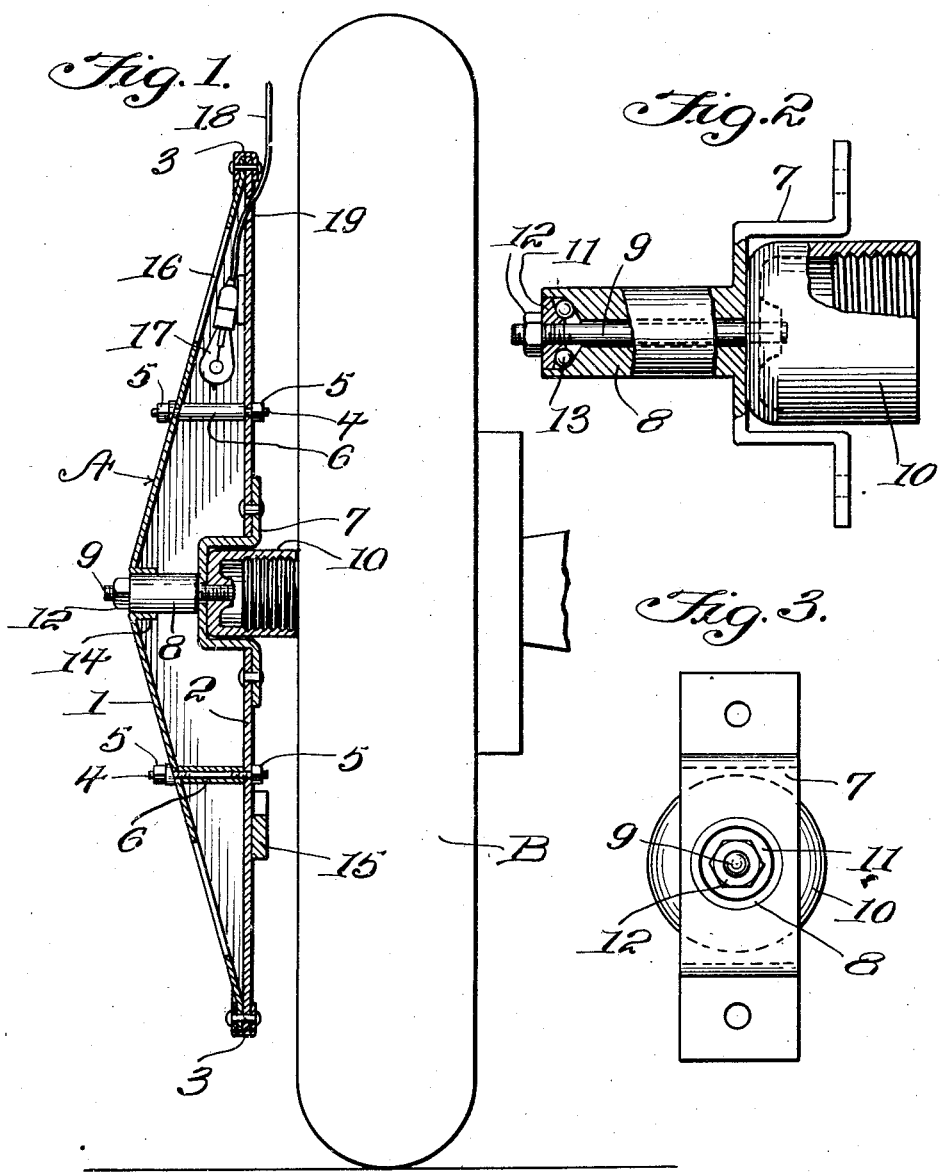

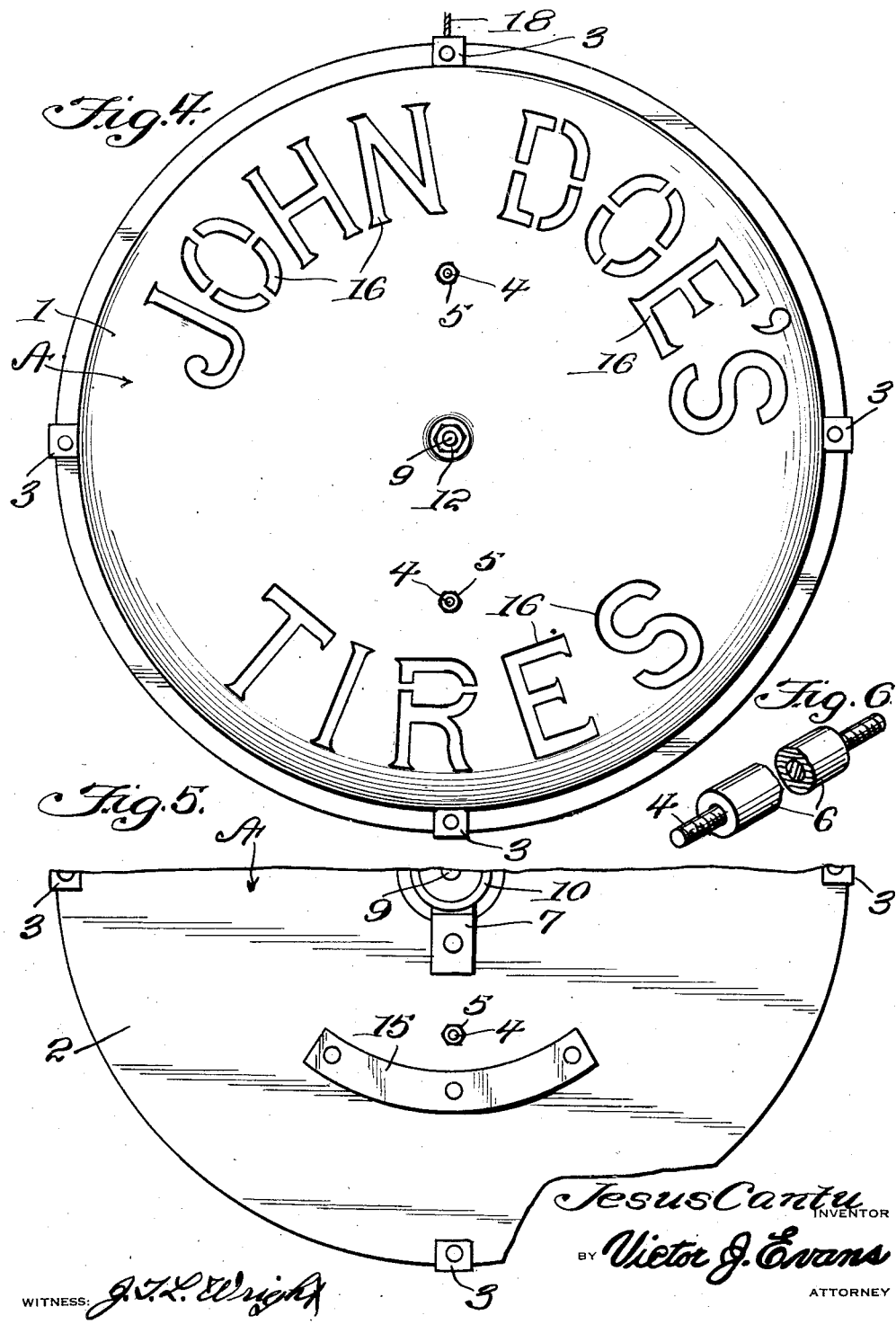

Patented Dec. 17, 1929

1,739,577

UNITED STATES PATENT OFFICE

JESUS CANTÚ, OF MONTEREY, MEXICO, ASSIGNOR OF ONE-THIRD TO JESUS MARTINEZ, OF LAREDO, TEXAS, AND ONE-THIRD TO RANULFO LOPEZ, OF MONTEREY, MEXICO

ELECTRIC SIGN

Application filed August 10, 1928. Serial No. 298,858.

This invention relates to an advertising device for the wheels of motor vehicles and the like, the general object of the invention being to provide a hollow circular member, with means for attaching it to the hub of a wheel of a vehicle with a weight for holding the member substantially stationary as the wheel revolves, the outer part of the member carrying advertising matter or the like, with a lamp within the member for illuminating such matter.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an edge view of a wheel, showing the invention attached thereto, with the device shown in section.

Figure 2 is an elevation partly in section, showing the manner of connecting the device with the hub cap of a wheel.

Figure 3 is a front view of Figure 2.

Figure 4 is a front view of the device.

Figure 5 is a fragmentary rear view showing the weight attached to the inner face of the device.

Figure 6 is a view of one of the spacing means for the two parts of the device.

As shown in these views, the member A is of circular shape and is composed of the two disks 1 and 2, the front disk being of substantially conical shape and the rear disk 2 of flat shape, the edges of the two disks being connected together by the clips 3 which are riveted or otherwise fastened to the disks. The two disks are also connected together by the bolts 4, each of which is threaded at each end to receive the nuts 5 and a spacer sleeve 6 is placed on each bolt with its ends engaging the inner faces of the disks. A channel-shaped bracket 7 is connected with the center of the disk 2 and extends inwardly through a hole in said disk and this part of the bracket is formed with a bushing 8 through which a bolt 9 passes, one end of the bolt being threaded into a hole formed in the hub cap 10 of the wheel B of the vehicle and the other end of the bolt is threaded to receive a ball race 11 and a nut 12. The outer end of the bushing is shaped to form a ball race and ball bearings 13 are placed between the two races, as clearly shown in Figure 2. The outer end of the bushing passes through a centrally arranged hole in the outer disk 1, an inwardly extending flange 14 being formed on the disk and surrounding the hole and this flange is secured to the bushing. Thus the circular member A is rotatably connected through means of the bushing and the bolt or shaft 9 with the hub cap. An arc-shaped weight 15 is secured to the rear face of the disk 2 and tends to hold the circular member stationary as the wheel revolves.

The front disk 1 is stenciled with the letters or characters 16 which form the advertising matter and an electric lamp 17 is placed in the device, the conductors 18 of which pass through a hole 19 in the upper part of the disk 2 and are connected with a suitable source of supply so that the device is illuminated when a suitable switch is turned to permit current to pass to the lamp.

From the foregoing it will be seen that I have provided an attractive advertising device for a wheel of a vehicle which remains stationary as the wheel revolves so that the advertising matter on the front of the device can be readily seen as the vehicle travels along.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising front and rear disks connected together, the front disk being of conical shape and the rear disk of flat shape, each disk having a hole at its center, with an inwardly extending flange surrounding the hole of the front disk, a bracket fastened to the rear face of the rear disk and extending into the hole thereof, a bushing formed on the bracket and extending through the flange on the front disk and to which the flange is secured, a shaft fastened to the hub cap of a wheel and passing through the bushing and the bracket whereby the bushing is rotatably supported on the shaft, indicia carried by the device and formed by stenciling the outer disk and illuminating means within the device.

In testimony whereof I affix my signature.

JESUS CANTÚ.